(12) United States Patent
Beale

(10) Patent No.: US 11,523,373 B2
(45) Date of Patent: *Dec. 6, 2022

(54) COMMUNICATING ON A SHARED CHANNEL IN A WIRELESS NETWORK

(71) Applicant: Intellectual Ventures Holding 81 LLC, Las Vegas, NV (US)

(72) Inventor: Martin Warwick Beale, Bristol (GB)

(73) Assignee: Intellectual Ventures Holding 81 LLC, Carson City, NV (US)

( * ) Notice: Subject to any disclaimer, the term of this patent is extended or adjusted under 35 U.S.C. 154(b) by 51 days.

This patent is subject to a terminal disclaimer.

(21) Appl. No.: 17/014,811

(22) Filed: Sep. 8, 2020

(65) Prior Publication Data
US 2020/0404643 A1 Dec. 24, 2020

Related U.S. Application Data

(63) Continuation of application No. 16/195,075, filed on Nov. 19, 2018, now abandoned, which is a continuation of application No. 15/611,309, filed on Jun. 1, 2017, now Pat. No. 10,136,416, which is a continuation of application No. 13/212,867, filed on
(Continued)

(51) Int. Cl.
*H04W 4/00* (2018.01)
*H04W 72/04* (2009.01)
*H04W 48/10* (2009.01)

(52) U.S. Cl.
CPC ........ *H04W 72/0406* (2013.01); *H04W 48/10* (2013.01)

(58) Field of Classification Search
CPC ....... H04W 4/02; H04W 4/021; H04W 4/023; H04W 4/025; H04W 4/027; H04W 4/029; H04W 4/06; H04W 4/08; H04W 4/12; H04W 4/14; H04W 4/16; H04W 4/18; H04W 4/20; H04W 4/24; H04W 4/30; H04W 4/38; H04W 4/40; H04W 4/42; H04W 4/44; H04W 4/46; H04W 4/48; H04W 4/50; H04W 4/60; H04W 4/70; H04W 4/80; H04W 4/90
See application file for complete search history.

(56) References Cited

U.S. PATENT DOCUMENTS 6,111,865 A  8/2000 Butler et al.
6,504,827 B1  1/2003 Kuo et al.
(Continued)

FOREIGN PATENT DOCUMENTS

CN  1089412 A  7/1994
CN  101043718 A  9/2007
(Continued)

OTHER PUBLICATIONS

Office Action, Japanese Patent Application No. 2010-526245, dated Jan. 15, 2013.
(Continued)

*Primary Examiner* — Bo Hui A Zhu
(74) *Attorney, Agent, or Firm* — Volpe Koenig

(57) ABSTRACT

A user equipment (UE) may receive a broadcast channel that includes a bits indicating possible resources for a downlink shared channel being utilized for a signaling channel. The UE may monitor, based on the indicated possible resources, the signaling channel for signaling information for the UE.

18 Claims, 8 Drawing Sheets

Related U.S. Application Data

Aug. 18, 2011, now Pat. No. 9,674,818, which is a continuation of application No. 11/863,205, filed on Sep. 27, 2007, now Pat. No. 8,027,291.

(56) References Cited

U.S. PATENT DOCUMENTS

| | | |
|---|---|---|
| 7,072,329 B2 | 7/2006 | Willars et al. |
| 7,088,697 B1 | 8/2006 | Benz et al. |
| 7,113,496 B2 | 9/2006 | Koo et al. |
| 7,318,187 B2 | 1/2008 | Vayanos et al. |
| 8,446,849 B2 | 5/2013 | Damnjanovic |
| 8,493,909 B2 | 7/2013 | Choi |
| 2005/0105502 A1 | 5/2005 | Kim et al. |
| 2005/0117553 A1 | 6/2005 | Wang et al. |
| 2005/0135320 A1 | 6/2005 | Tiedemann et al. |
| 2007/0042786 A1 | 2/2007 | Chillariga et al. |
| 2008/0014969 A1 | 1/2008 | Laroia et al. |
| 2008/0186936 A1 | 8/2008 | Chun et al. |
| 2008/0188220 A1 | 8/2008 | DiGirolamo et al. |
| 2008/0207229 A1* | 8/2008 | Cave .................. H04W 52/0209 455/458 |
| 2008/0311926 A1 | 12/2008 | Fischer et al. |
| 2009/0207774 A1 | 8/2009 | Lee et al. |
| 2010/0234032 A1 | 9/2010 | Chun et al. |
| 2013/0028234 A1 | 1/2013 | DiGirolamo et al. |

FOREIGN PATENT DOCUMENTS

| | | |
|---|---|---|
| CN | 1860808 B | 1/2012 |
| GB | 2260245 A1 | 4/1993 |
| JP | 11243579 A2 | 9/1999 |
| JP | 2000201196 A2 | 7/2000 |
| JP | 2002532987 T2 | 10/2002 |
| WO | 2005034542 A1 | 4/2005 |
| WO | 2005101879 A1 | 10/2005 |
| WO | 2007052187 A1 | 5/2007 |

OTHER PUBLICATIONS

Third Generation Partnership Project, "Technical Specification Group Radio Access Network; High Speed Downlink Packet Access (HSDPA); Overall description; Stage 2 (Release 6)," 3GPP TS 25.308 V6.4.0, Mar. 2007.

Third Generation Partnership Project, "Technical Specification Group Radio Access Network; High Speed Downlink Packet Access (HSDPA); Overall description; Stage 2 (Release 7)," 3GPP TS 25.308 V7.3.0, Jun. 2007.

Nokia, "Analysis of HSDPA in CELL_FACH State," R1-062884, 3GPP TSG-RAN WG1 Meeting #46bis, Seoul, South Korea, Oct. 9-13, 2006.

Third Generation Partnership Project, "Technical Specification Group Radio Access Network; Physical Channels and Mapping of Transport Channels onto Physical Channels (TDD) (Release 6)," 3GPP TS 25.221 v6.4.0, Jun. 2005.

Third Generation Partnership Project, "Technical Specification Group Services and System Aspects; Multimedia Broadcast/Multicast Service; Stage 1 (Release 8)," 3GPP TS 22.146 v8.3.0, Jun. 2007.

Non-Final Rejection issued by USPTO, dated Sep. 30, 2010 for U.S. Appl. No. 11/863,205.

Notice of Allowance issued by USPTO, dated Jun. 13, 2011 for U.S. Appl. No. 11/863,205.

International Search Report, PCT Application No. PCT/EP2008/062177, dated Mar. 4, 2009.

Non-Final Rejection, U.S. Appl. No. 13/212,867, dated Jul. 9, 2015.

Non-Final Rejection, U.S. Appl. No. 13/212,867, dated Aug. 8, 2013.

Non-Final Rejection, U.S. Appl. No. 13/212,867, dated May 22, 2014.

Final Rejection, U.S. Appl. No. 13/212,867, dated Mar. 21, 2016.

Final Rejection, U.S. Appl. No. 13/212,867, dated Dec. 17, 2014.

Final Rejection, U.S. Appl. No. 13/212,867, dated Feb. 10, 2014.

Extended European Search Report, European Patent Application No. 17163346, dated Oct. 18, 2017.

Non-Final Rejection, U.S. Appl. No. 15/611,309, dated Dec. 1, 2017.

Notice of Allowance, U.S. Appl. No. 15/611,309, dated Jul. 17, 2018.

Non-Final Office Action, U.S. Appl. No. 16/195,075, dated Jan. 9, 2020.

Final Rejection, U.S. Appl. No. 16/195,075, dated May 5, 2020.

* cited by examiner

COMMUNICATING ON A SHARED CHANNEL IN A WIRELESS NETWORK

CROSS REFERENCE TO RELATED APPLICATION(S)

This application is a continuation of U.S.C. patent Ser. No. 16/195,075, filed Nov. 19, 2018, which is a continuation of U.S. patent application Ser. No. 15/611,309, filed Jun. 1, 2017, which issued as U.S. Pat. No. 10,136,416 on Nov. 20, 2018, which is a continuation of U.S. patent application Ser. No. 13/212,867, filed Aug. 18, 2011, which issued as U.S. Pat. No. 9,674,818 on Jun. 6, 2017, which is a continuation of U.S. patent application Ser. No. 11/863,205, filed Sep. 27, 2007, which issued as U.S. Pat. No. 8,027,291 on Sep. 27, 2011, which are incorporated by reference as if fully set forth.

FIELD OF THE INVENTION

The field of the invention relates, in general, to a method and apparatus for transmitting transport channels over a physical channel of a cellular communication system. In particular, but not exclusively, the field of the invention relates to allocating channel resources within a physical channel of a cellular communication system.

BACKGROUND OF THE INVENTION

Known cellular communication systems, such as a Universal Mobile Telecommunications System (UMTS) Radio Access Network (UTRAN), standardised by the 3$^{rd}$ Generation Partnership Project (3GPP), typically consist of a set of radio network controllers (RNCs), Node B, also known as Node-Bs, and mobile stations (MSs), also known as User Equipment (UEs). FIG. 1 illustrates an example of a known network topology for part of such a cellular communication system 100.

The RNCs 105 provide a connection with, for example, a Media Gateway (not shown), which acts as a translation unit between, in this case, the UMTS network and, for example, a Public Switched Telephone Network (PSTN). The RNC 105 also performs some of the higher layer processing for the UMTS network, performing functions, such as, setting up and managing radio bearers, radio resource management, supporting mobility, controlling initial access of UEs to the communication system, radio link control (RLC), etc.

The Node Bs 110 typically perform lower layer processing for the network, performing such functions as Medium Access Control (MAC), formatting blocks of data for transmission and physically transmitting transport blocks to UEs.

As can be seen in FIG. 1, Node Bs 110 are connected to an RNC 105 via an interface (Iub) 115. This interface between a Node B 110 and an RNC 105 may be a leased line, for example provided by a fixed line telecommunications provider, a microwave link, an Ethernet cable or some other form of communication link. The Node Bs are connected wirelessly to the UEs 120.

In order to conserve battery life, when a UE 120 is not involved in active connections, it is known for the UE 120 to go into an idle state, whereby the UE powers down its radio frequency circuitry (RF). When a UE 120 is in the idle state, it is important to allow the Node B to initiate a connection to the UE 120, for example when there is an in-coming call for the UE 120.

In order to achieve this, it is known for a UE 120 to periodically power up its radio circuitry in order to monitor specific channels in order to determine whether it is required to establish a connection with the network. UMTS provides two services with which a Node B is able to indicate to a specific UE 120 that it is required to establish a connection with the network. One is termed a Paging CHannel (PCH) and the other is termed a Forward Access CHannel (FACH). Details of these and other services are provided in 3GPP TS 25 221 (Universal Mobile Telecommunications System (UMTS); Physical channels and mapping of transport channels onto physical channels (TDD)) and other documents referenced therein.

The PCH is a downlink transport channel that is used to carry control information to a UE when the network does not know the specific location of the UE, i.e. the specific Node B to which the UE is attached.

In the known art, the PCH comprises two blocks: the Paging Indicator CHannel (PICH) and the PCH itself. The PICH comprises multiple indicator bits. Each UE is associated with one of the indicator bits within the PICH. Accordingly, when the UE is paged by the network using the PCH, the network sets the relevant indicator bit in the PICH. When in the idle state, the UE periodically decodes the PICH to see if the indicator bit with which it is associated has been set. If the relevant indicator has been set, the UE then reads the PCH.

Each UE has a unique identifier (UE-ID). When the network pages a UE, as previously mentioned, the network sets the relevant indicator within the PICH for that UE, and transmits the UE-ID for the UE being paged, and the relevant message within the PCH. In this manner, since more than one UE may be associated with an indicator bit in the PICH, the UE-ID enables a UE to determine whether the message is intended for that UE or not. If the PCH contains the UE-ID for the UE, the UE then reads the message, and performs the required actions. Thus, in the known art, the indicator bits are used in a paging channel to inform the UE whether it needs to turn its radio on for reading the PCH (i.e. as a battery saving mode).

The UMTS standard dictates that the PCH (and PICH) are always transmitted at a reference power level.

In a wireless communications system, the communication medium is divided into units of resource. A unit of resource can be a single code (e.g. UMTS FDD), a plurality of codes, a set of codes and timeslots (e.g. UMTS TDD), a set of timeslots (e.g. a TDD system) or a set of tones, tones and symbols or tones, symbols and timeslots (e.g. an OFDM system).

The FACH is a downlink transport channel that is used to carry control information to a UE when the system knows the location cell of the UE, e.g. the specific Node B to which the UE is attached. The FACH allows short messages to be sent from the Node B to the UE. These short messages are typically control type messages that are used, for example, to allocate physical resources to the UE, set up dedicated physical channels, etc.

The FACH is transmitted on a set of physical resources that are pre-defined and broadcast by the Node B on a Broadcast CHannel (BCH). The FACH is controlled by the RNC, which defines the codes and timeslots that are reserved for FACH transmissions. The RNC also reserves an amount of power headroom for the transmission of the FACH. When the FACH is transmitted, the RNC defines the power with which the FACH must be transmitted by the Node B. Power headroom is the amount of power that the RNC reserves for allocation of FACH resources. The power that is not reserved for 'power headroom' is allocated to the Node B to do with as it sees fit (for example scheduling HS-DSCH resource into). Thus, when the RNC allocates power headroom, it informs the Node B that the Node B cannot allocate that power headroom, as the power headroom is reserved by the RNC for the RNC to allocate resource into.

Unlike the PCH (and PICH), the FACH is not required to always be transmitted, and typically is only used when a message is required to be sent to a UE.

FIG. 2 illustrates a high level signal flow example 200 of an implementation for FACH transmissions. An RNC sends a 'NODE B SETUP' message to a Node B, instructing the Node B to reserve a certain set of codes and timeslots for FACH transmissions. This message may also reserve power headroom for use by the RNC. In UMTS, the 'NODE B SETUP' message for configuring the FACH transport channel is the 'COMMON TRANSPORT CHANNEL SETUP' message, sent to the Node B over the Iub interface 115.

The Node B 110 then periodically transmits a 'SYSTEM INFORMATION' message 210 on the Broadcast CHannel (BCH). This SYSTEM INFORMATION message 210 informs UEs of the physical resources used for FACH transmissions, such as the codes and timeslots in a Code Division Multiple Access (CDMA) system or the sub-carriers and timeslots in an Orthogonal Frequency-Division Multiplexing (OFDM) system. The SYSTEM INFORMATION message 210 typically also contains other broadcast information relevant to that cell, such as the network identity etc.

A UE 120 is able to receive the SYSTEM INFORMATION message 210, and configure its FACH decoding function based on the information contained within the SYSTEM INFORMATION message 210.

When the RNC 105 needs to send a message to a UE 120 using the FACH, the RNC sends a 'SEND FACH' message 215 to the Node B. In UMTS, the 'SEND FACH' message is carried using FACH frame protocol (FACH FP) messages over the Iub interface 115. The SEND FACH message 215 defines the specific code and timeslot to be used for the FACH transmission 220 from the Node B 110 to the UE 120, as well as the power level to be applied to the FACH transmission, the message contents and the identity of the UE (the UE-ID) that are to be included in the FACH transmission. The Node B 110 subsequently transmits the FACH message 220 to the UE 120, as defined by the RNC 105 in the SEND FACH message 215.

The UE 120 decodes the FACH 220 every frame, according to the definition of the FACH provided within the SYSTEM INFORMATION message 210. If the UE-ID in the FACH message 220 matches the identity that has been assigned to the UE 120, the UE 120 acts on the message contents in the FACH 220.

FIG. 3 illustrates an example of a known assignment of physical resources 300 for a single Time Division Duplex (TDD) system, and shows that one timeslot per frame is assigned for FACH usage. As previously mentioned, the physical resources 300 for the FACH are pre-assigned by the RNC 105, in the NODE B SETUP message 205, and cannot be reused by other channels. Even when the FACH is lightly used, for example when most UEs are in a connected state, receiving data traffic on a traffic channel, indicated as a High Speed Downlink Shared Channel (HS-DSCH) 305 in FIG. 3, the FACH timeslot 310 is still required to be reserved.

As will be appreciated by a skilled artisan, the fact that the FACH timeslot 310 is required to be reserved, particularly during light use of the FACH, is an inefficient use of physical resources. Consequently, the inventor of the present invention has recognised and appreciated that it is desirable for the timeslot 310 assigned to the FACH to be able to be used for other purposes when it is not required for the transmission of FACH messages. For the example illustrated in FIG. 3, the traffic channel resources, namely the HS-DSCH resources 305, comprise seven timeslots. If the timeslot 310 reserved for FACH transmissions could be utilised for a traffic channel during periods when no FACH transmissions were required to be sent, the traffic channel resources could be increased from seven timeslots to eight timeslots. This would increase the traffic channel resources by fourteen percent (14%) during those periods.

A known solution for the reuse of the FACH timeslot is for the traffic channel resources, which for the example illustrated in FIG. 3 is in the form of the HS-DSCH 305, to be used for the transmission of FACH messages. In this case, the information that would have been transmitted on the FACH transport channel is instead transmitted on the HS-DSCH transport channel. In this solution the Node B 110, as opposed to the RNC 105, controls the FACH, and the FACH timeslot of FIG. 3 becomes an HS-DSCH timeslot. In this manner, in the example of FIG. 3, the HS-DSCH 305 always comprises eight timeslots, as opposed to seven.

The HS-DSCH 305 is a shared channel that is controlled by the Node B 110. The content of the HS-DSCH 305 is allocated via Shared Control CHannels for the HS-DSCH (HS-SCCH) 315, which is a downlink physical channel that carries higher layer control information for the HS-DSCH.

The HS-SCCH 315 contains a UE-ID relating to the UE 120 for which content within the HS-DSCH 305 is intended. The UE-ID ensures that only that UE 120 for which the content of the HS-DSCH 305 is intended decodes the HS-SCCH 315 successfully. The HS-SCCH 315 also instructs the UE of those codes and timeslots that are allocated to it for the HS-DSCH 305 transmission allocated to it, and the coding and modulation of the HS-DSCH 305, e.g. code rate and modulation order, such as quadrature phase shift keying (QPSK), 16-QAM (Quadrature Amplitude Modulation), etc. Having decoded the HS-SCCH 315, the UE 120 is able to decode relevant timeslot(s) of the HS-DSCH 305 using the information contained within the HS-SCCH 315, and retrieve the relevant content.

When the HS-DSCH 305 is used to transmit the FACH, the codes and timeslots that are used for the HS-SCCH 315, as well as a FACH-ID are broadcast by the Node B, for example within the SYSTEM INFORMATION message 210 illustrated in FIG. 2. UEs that are required to monitor the FACH subsequently attempt to decode the HS-SCCH 315 using the FACH-ID. If a UE 120 is successful in decoding the HS-SCCH 315 using the FACH-ID, a FACH message is present within the HS-DSCH 315.

Having decoded the HS-SCCH 315 using the FACH-ID, the UE 120 then decodes the relevant part of the HS-DSCH 305 as allocated by the HS-SCCH 315, and using the information provided within the HS-SCCH 315.

The UE-ID of the relevant UE 120 is included with the HS-DSCH 305. If this matches the UE-ID of the UE 120 decoding the HS-DSCH 305, the UE 120 acts on the FACH message contents in the HS-DSCH 305.

When a FACH message is to be sent to a UE 120, the RNC 105 requests the Node B 110 to send a FACH to a UE 120 with a certain message. The Node B 110 then schedules the transmission of the FACH message in the HS-DSCH 305, along with any traffic data that is to be sent in the HS-DSCH 305. The Node B 110 chooses the codes and timeslots that are to be used for the HS-DSCH 305 carrying the FACH message, as well as the coding and modulation to be applied to the HS-DSCH 305. The Node B then transmits an HS-SCCH 315 that allocates the codes and timeslots on the HS-DSCH 305 for the FACH message, along with the coding and modulation used, and encodes the HS-SCCH 315 using the FACH-ID.

When there are no requests from the RNC 105 for the Node B 110 to transmit a FACH message, the Node B is able to use all of the HS-DSCH 305 resource for traffic data. In this manner, physical resources are used more efficiently, and in particular physical resources are not permanently assigned for transmitting FACH messages, in particular when no, or few, FACH messages are required to be transmitted.

However, a problem with this known technique for reusing the FACH timeslot is that it requires the use of the HS-SCCH 315 and the HS-DSCH 305 channels for transmitting FACH messages, as opposed to just a FACH channel, and as such carries a penalty in terms of power consumption.

FACH messages may be transmitted to a UE 120 when the UE is in an idle state (or alternatively in a connected state). Accordingly, the Node B 110 is unaware of the state of the transmission path between itself and the UE 120. As a result, normal power control is ineffective since the Node B 110 has no information with which to make an informed decision on the appropriate power level to use. Consequently, the power requirements must initially depend on the number of bits to be transmitted, and the coding rate, without explicit knowledge of the path loss between the UE and Node B.

A number of bits transmitted on the HS-SCCH 315 is comparable to a number of bits that are transmitted on a traditional FACH, in the order of 60 bits (57 bits for a 3.84 Mcps TDD HS-SCCH). The exact number of bits to be transmitted on the FACH depends on the particular implementation. The power requirements for HS-SCCH 315 and FACH at the start of a connection are therefore substantially the same, due to the similar number of bits to be carried on each channel, for example approximately 33% of the Node B transmit power.

A problem with this known technique for reusing the FACH timeslot is that both the HS-SSCH 315 and the HS-DSCH 305 must be used in order to transmit a FACH message, each requiring approximately 33% of the Node B transmit power, albeit in different timeslots. This is in contrast to the traditional method of transmitting FACH messages, where using the dedicated FACH timeslot only required the one timeslot. Thus, the known technique for reusing the FACH timeslot requires an additional timeslot at 33% of the Node B transmit power.

A skilled artisan will appreciate that, although the reuse of the FACH timeslot by mapping the FACH onto HS-DSCH resources provides a considerable improvement in the use of the physical resources, this increase in the power requirements is undesirable.

SUMMARY OF THE INVENTION

Accordingly, the invention seeks to mitigate, alleviate or eliminate one or more of the abovementioned disadvantages, singly or in any combination.

According to a first aspect of the invention, there is provided a cellular communication network node comprising a transmitter operably coupled to signal processing logic and arranged to transmit at least one direct signalling channel indicator bit generated by the signal processing logic. The signal processing logic is arranged, upon receipt of a message to be transmitted, to set at least one direct signalling channel indicator bit to indicate that a direct signalling channel is active in at least one unit of resource. The signal processing logic is further arranged to reallocate the at least one unit of resource for use by at least one other channel when no message is required to be transmitted.

Thus, embodiments of the invention may allow improved use of the communication resource in the communication system, for example by allowing physical resource to be dynamically switched between different channel types.

According to an optional feature of the invention, the signal processing logic may be arranged to generate direct signalling channel resource information comprising a description of the physical resources and transport formats applied to the direct signalling channel(s). Thus, embodiments of the invention may allow the physical resources of the direct signalling channel to be transmitted relatively infrequently to all UEs. Thus, in this manner, a reduction in the signalling load is provided, as compared to the classic case where the physical resources for the direct signalling channel are sent whenever the direct signalling channel is allocated.

According to an optional feature of the invention, the signal processing logic may be arranged, upon receipt of a message to be transmitted, to set the at least one direct signalling channel indicator bit in a first frame, and to transmit the message in a second frame. For example, the second frame may be a next consecutive frame to the first frame. Thus, embodiments of the invention may allow the UE to have a longer time to process the indicator bit, thereby allowing the UE complexity to be reduced and/or to allow the UE to turn its receiver off in the time during which the direct signalling channel is transmitted.

According to an optional feature of the invention, the signal processing logic may allocate a plurality of direct signalling channels to at least one unit of resource. Thus, embodiments of the invention may allow the system to operate with a reduced number of direct signalling channel indicator bits. The bits that are freed up on the indicator channel may then be used for other indication purposes (e.g. paging or E-DCH ACK/NACK signalling).

According to an optional feature of the invention, the signal processing logic may generate a single direct signalling channel indicator bit for transmission, or a plurality of direct signalling channel indicator bits, one for each direct signalling channel, or a number of indicator bits for transmission, where each indicator bit corresponds to a plurality of direct signalling channels. Thus, embodiments of the invention may allow for finer granularity control of the allocated direct signalling channel, for example the network may allocate some of the resource as direct signalling channel instead of either allocating all or none of the resource. This allows for more targeted allocation of resource to direct signalling channels and traffic channels (e.g. HS-DSCH).

According to an optional feature of the invention, the signal processing logic may be arranged to allocate a plurality of direct signalling channels to a plurality of units of resource. Thus, embodiments of the invention may allow a single indicator bit to control more than one direct signalling channel, thus either allowing more direct signalling channels (when the number of indicator bits that can be sent are constrained) or reduced usage of the indicator bits.

According to an optional feature of the invention, the signal processing logic, upon receipt of at least one message to be transmitted, may be arranged to reallocate at least one unit of resource not required for transmitting the one or more message, for use by at least one channel other than the direct signalling channel. Thus, embodiments of the invention may allow better usage of the resource, for example some of the resource may be assigned to the direct signalling channel and some of the resource may be reassigned to the other channel when it is not needed for the direct signalling channel. Furthermore, the usage of the resource may be more tailored to the traffic profile, if the direct signalling channel is not greatly required, but there is a lot of traffic on the traffic channel.

According to an optional feature of the invention, the at least one direct signalling channel may be a Forward Access Channel(s) (FACH) within a Universal Mobile Telecommunications System (UMTS) network. For example, the at least one direct signalling channel unit of resource may be re-allocated for use by a High Speed Downlink Shared CHannel (HS-DSCH). Thus, embodiments of the invention may allow direct applicability to an application. In this case, for example, under-utilised FACH resource may be transferred to HS-DSCH resource, thus increasing the potential throughput of HS-DSCH.

According to an optional feature of the invention, the signal processing logic may generate the at least one direct signalling channel indicator bit within a Broadcast CHannel (BCH) for broadcast. For example, the signal processing logic may locate the at least one direct signalling channel indicator bit within a Transport Format Combination Indicator (TFCI) type field within the BCH. Furthermore, according to an optional feature of the invention, the signal processing logic may generate the direct signalling channel indicator bit(s) as part of a data portion of the BCH for broadcast. Thus, embodiments of the invention may allow transmission directly on the broadcast channel, thereby removing a need for a separate indicator channel. Alternatively, when an indicator channel naturally exists (e.g. PICH or E-HICH), the paging or E-DCH acknowledgement capacity of those indicator channels is not reduced, as direct signalling channel indicator bits do not replace indicator bits that might be required for the other functions, such as PICH or E-HICH.

According to an optional feature of the invention, the signal processing logic may generate the at least one direct signalling channel indicator bit within a dedicated direct signalling channel indicator channel or within a dedicated paging indicator channel or within a E-DCH Hybrid ARQ Indicator CHannel (E-HICH) of a Universal Mobile Telecommunications System (UMTS) network. Thus, embodiments of the invention may allow a reduction in usage of the broadcast channel. In this manner, an indicator channel may also be more lightly coded (than a broadcast channel), thereby allowing for lower power/lower complexity decoding of the indicator channel (compared to a case where the indicator bits are sent on the broadcast channel).

In accordance with a second aspect of the invention there is provided a method for transmitting transport channels over a physical channel of a cellular communication system. The method comprises determining whether at least one message is to be transmitted. If it is determined that at least one message is required to be transmitted, scheduling the at least one message for transmission in at least one unit of resource allocated to at least one direct signalling channel, and setting at least one direct signalling channel indicator bit for transmission. If it is determined that no message is to be transmitted, re-allocating at least one unit of resource allocated for use by the at least one direct signalling channel for use by at least one channel other than the direct signalling channel. Thus, embodiments of the invention may provide a more flexible usage of resources, for example direct signalling channel resource that is under-utilised may be re-assigned to other (e.g. traffic) channels.

In accordance with a third aspect of the invention there is provided a computer program product comprising program code for signalling in a wireless communication system from a network element to a wireless communication unit. The computer program product comprising program code for setting, upon receipt of a message to be transmitted, at least one direct signalling channel indicator bit. The program code further comprises code for transmitting a message in at least one unit of resource allocated for use as a direct signalling channel, and re-allocating the at least one unit of resource allocated to the direct signalling channel for use by at least one other channel when no message is required to be transmitted. Thus, embodiments of the invention may allow the system to run on general purpose hardware, thus reducing cost.

In accordance with a fourth aspect of the invention there is provided a wireless communication unit arranged to receive a signalling message allocating a first set of resources in a wireless communication system from a cellular communication network node. The wireless communication unit further comprises logic for receiving a at least one direct signalling channel indicator bit on a communication channel, the at least one direct signalling channel indicator bit allocating a direct signalling channel. The wireless communication unit further comprises logic for modifying the wireless communication unit's first set of resources in response to a status of the at least one direct signalling channel indicator bit.

In the existing 3GPP system, for example, whenever any resource is applied to FACH, resources in the FACH slot and HS-DSCH resources cannot easily be allocated to the same UE, since the amount of resource in the FACH slot and HS-DSCH slot differ and existing signalling restrictions mean that the same amount of physical resource has to be allocated in each timeslot. Thus, embodiments of the invention address this limitation and may allow the system to allocate more resource to a UE.

In this manner, in contrast to normal 3GPP operation where the same number of codes has to be allocated to a wireless communication unit in all of the timeslots that it is allocated due to signalling restrictions, the wireless communication unit is signalled whether FACH is active. Advantageously, the wireless communication unit is able to use this indication to modify, for example, the HS-DSCH resource allocation, as the wireless communication unit knows that if the FACH indicator bit was set then any HS-DSCH resources that are common to FACH resources in the FACH timeslot must be allocated to FACH and not to HS-DSCH.

In accordance with a fifth aspect of the invention there is provided a method for resource allocation in a wireless communication system by a wireless communication unit. The method employed by the wireless communication unit comprises receiving by a wireless communication unit a signalling message allocating a first set of resources in a wireless communication system via at least one direct signalling channel indicator bit on a communication channel, the at least one direct signalling channel indicator bit allocating a direct signalling channel; and modifying the wireless communication unit's first set of resources in response to a status of the at least one direct signalling channel indicator bit.

These and other aspects, features and advantages of the invention will be apparent from, and elucidated with reference to, the embodiments described hereinafter.

Figure 1:
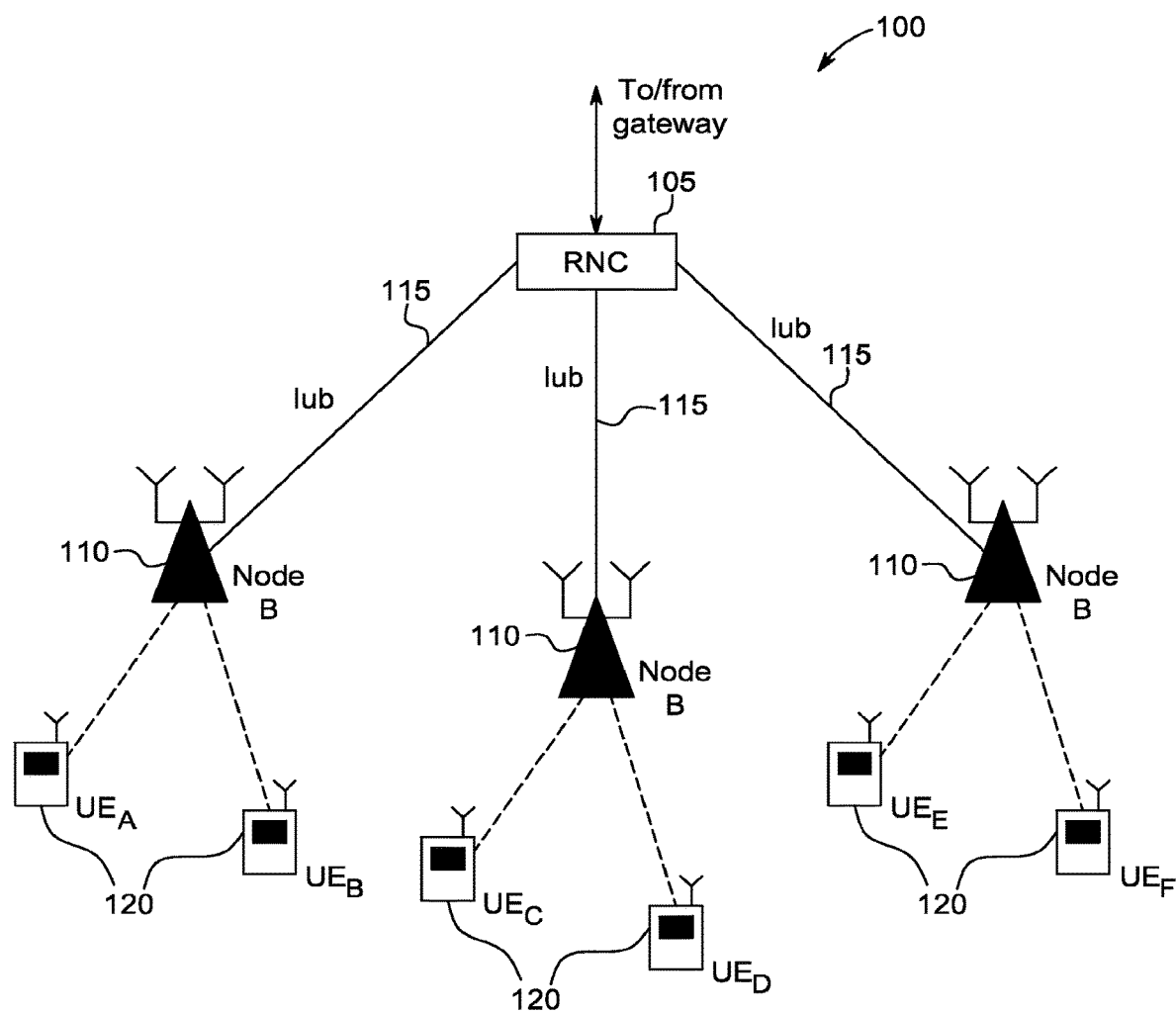
FIG. 1 shows an example of a known network topology for part of a cellular
Figure 2:
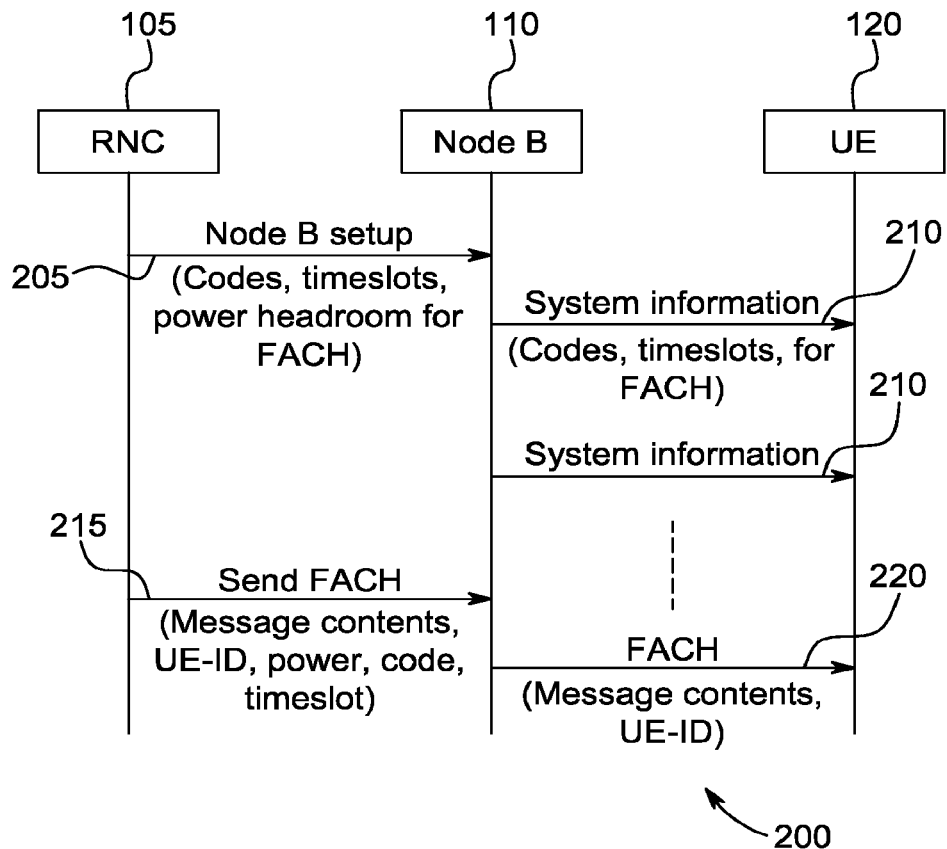
FIG. 2 shows a high level example of a known implementation for FACH channel transmissions.
Figure 3:
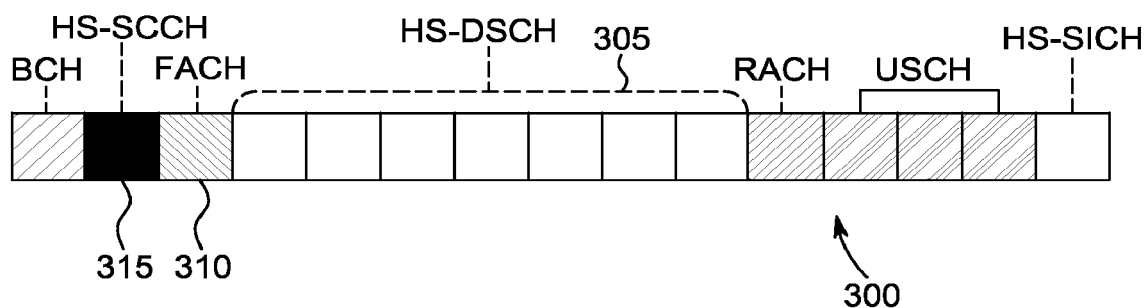
FIG. 3 shows an example of a known assignment of physical resources.
Figure 4:
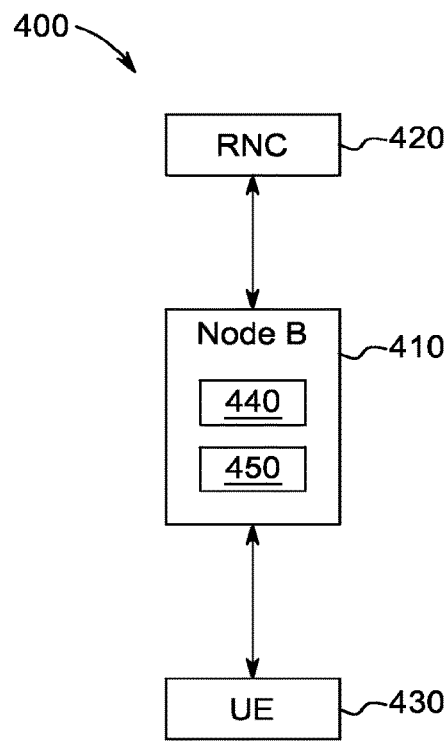

Embodiments of the invention will now be described, by way of example only, with reference to the accompanying drawing(s), in which:

FIG. 4 shows part of a cellular communication system in accordance with embodiments of the invention.

Figure 5:
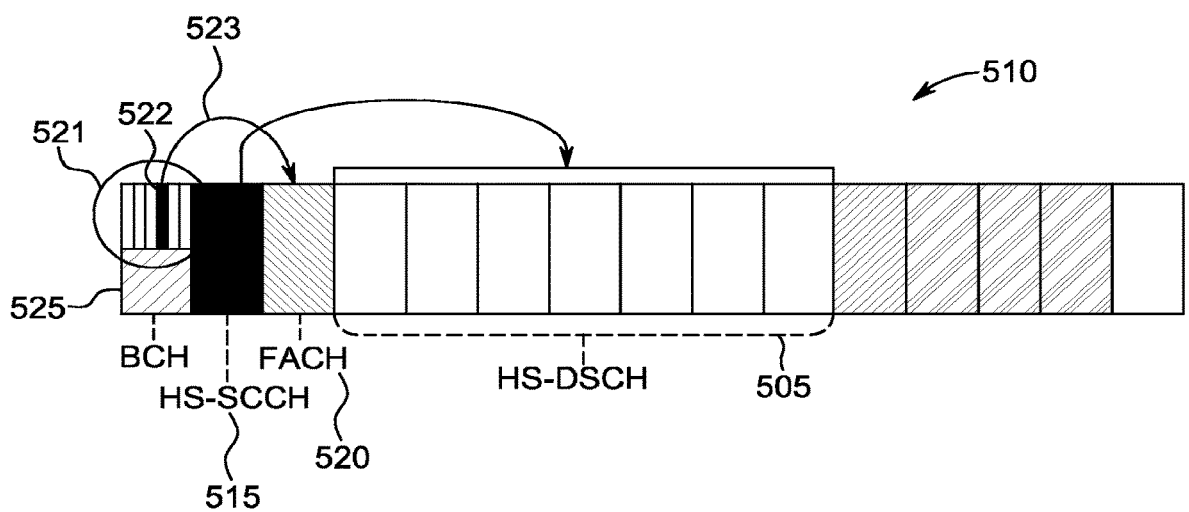
Figure 6:
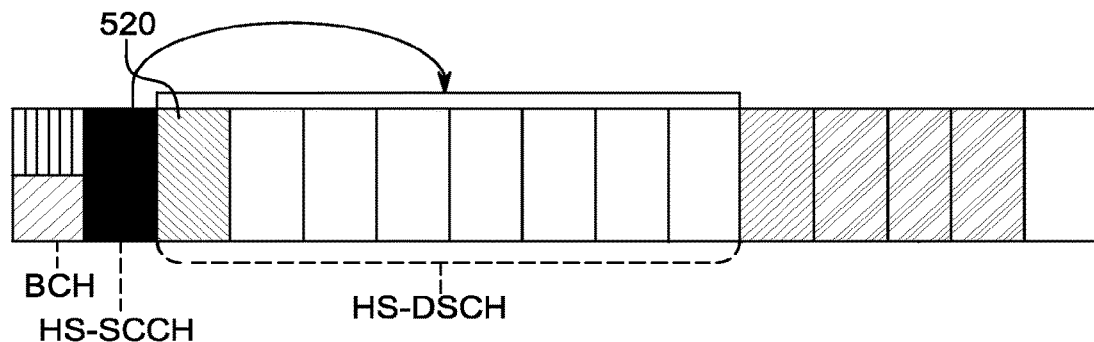

FIG. 5 and FIG. 6 show an example of resource allocation in accordance with embodiments of the invention.

Figure 7:
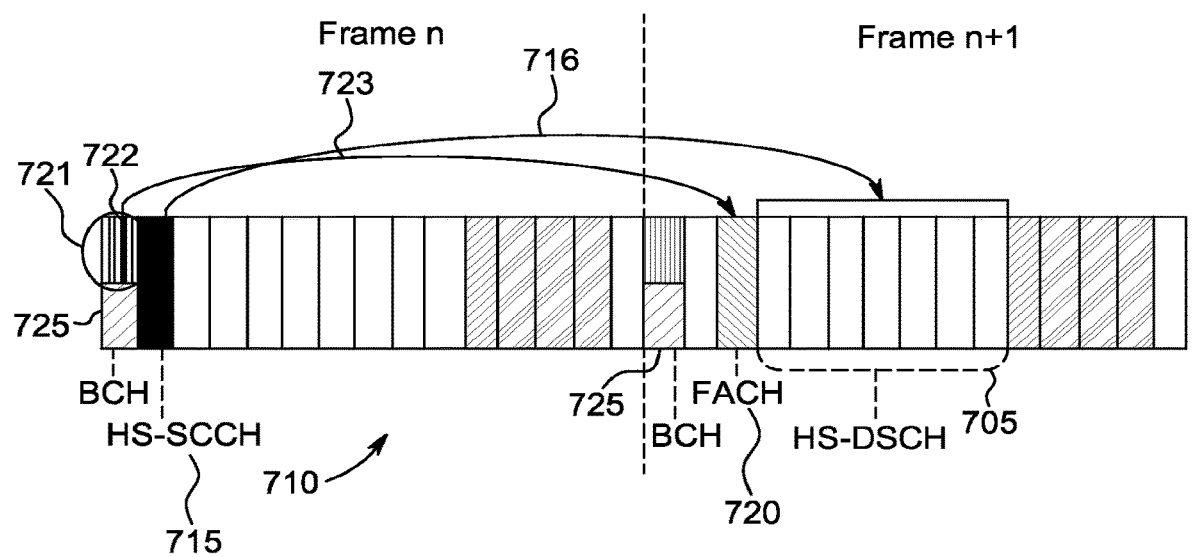

FIG. 7 shows an example of resource allocation in accordance with embodiments of the invention.

Figure 8:
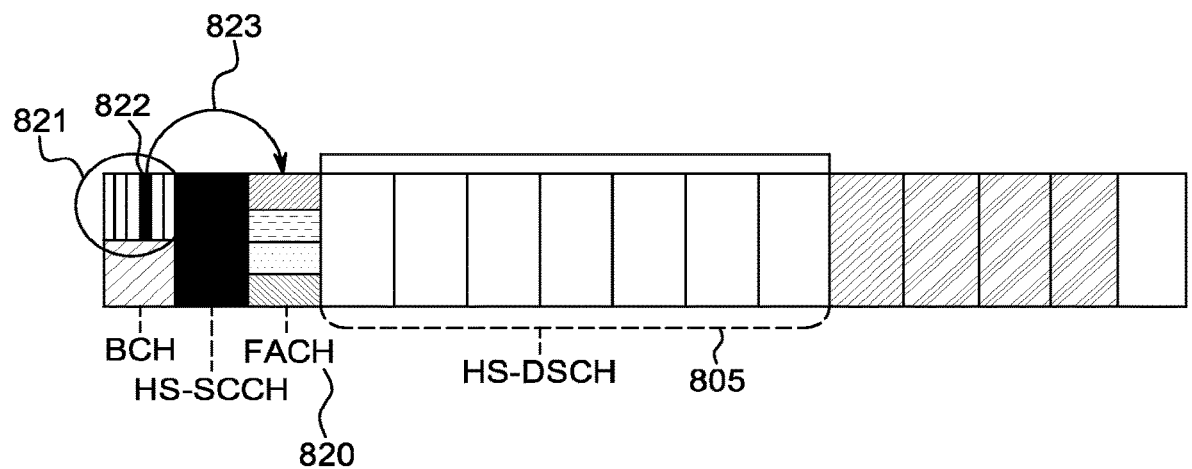

FIG. 8 shows an example of resource allocation in accordance with embodiments of the invention.

Figure 9:
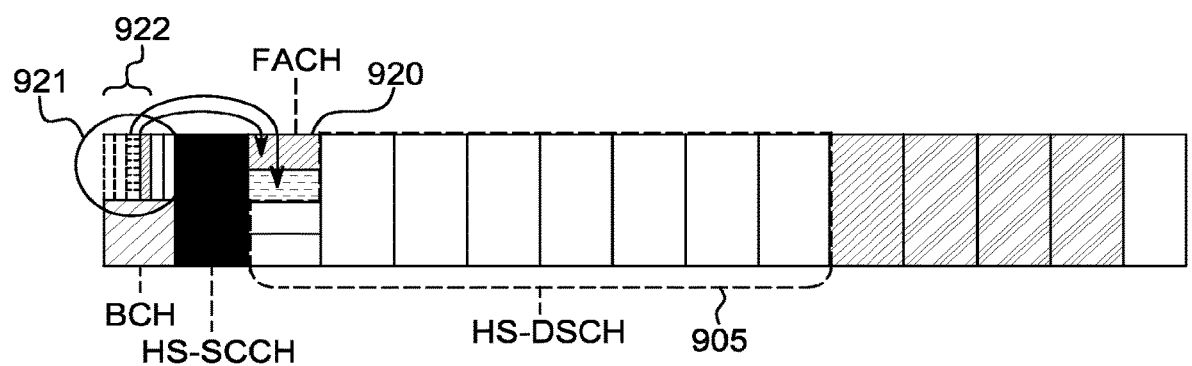

FIG. 9 shows an example of resource allocation in accordance with embodiments of the invention.

Figure 10:
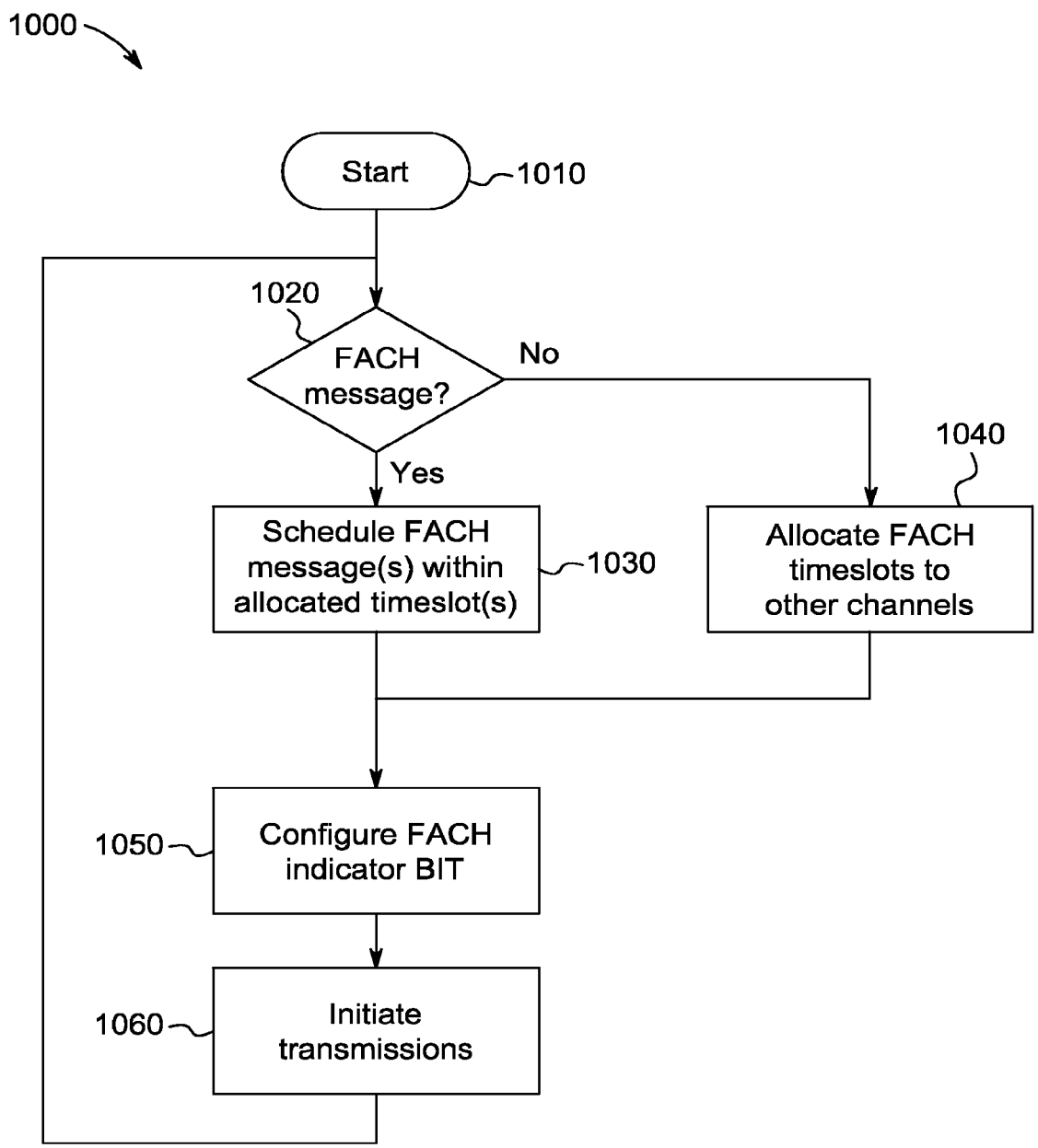

FIG. 10 shows a flowchart of a method for transmitting transport channels over a physical channel of a cellular communication system in accordance with embodiments of the invention.

Figure 11:
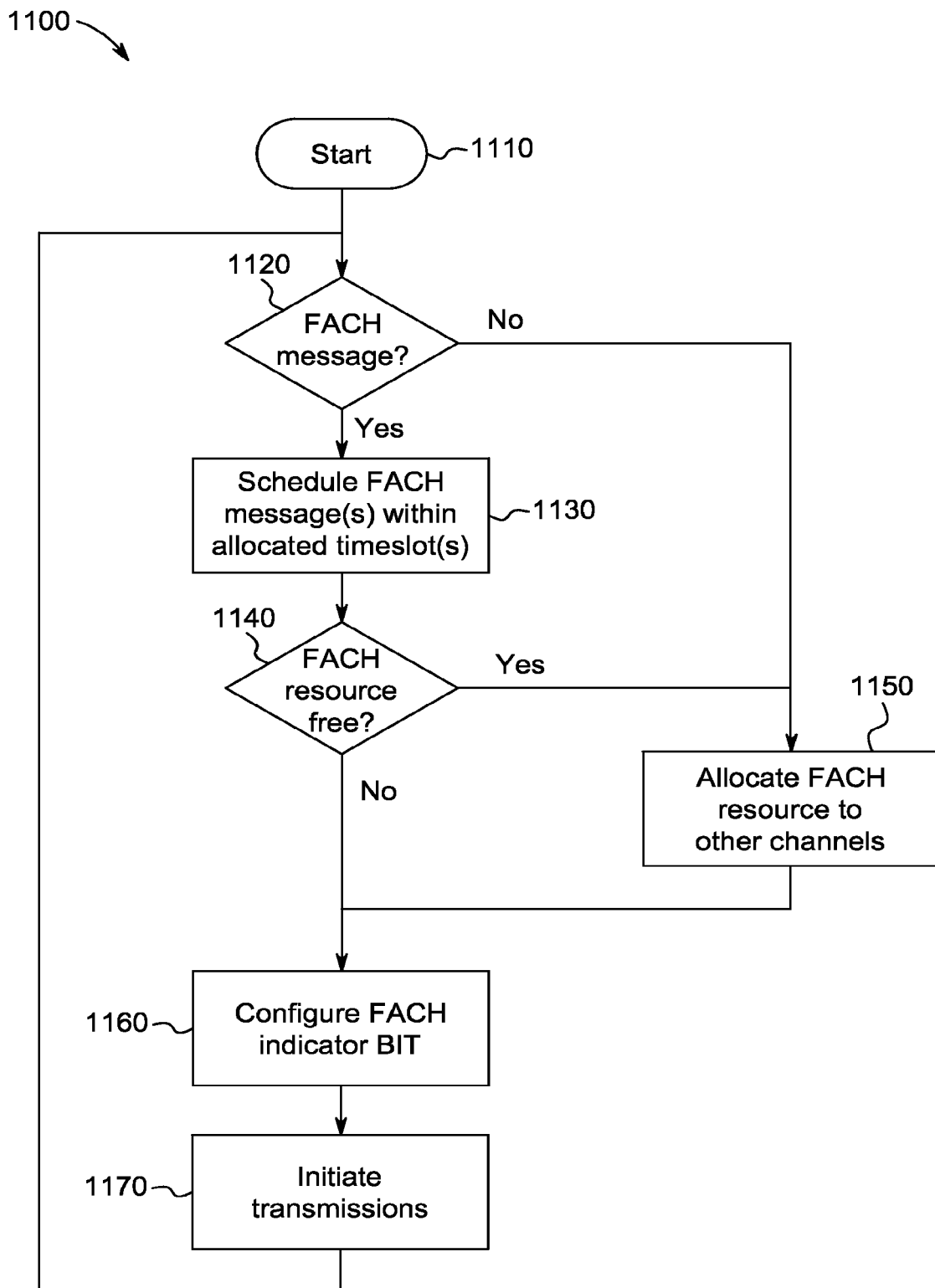

FIG. 11 shows a flowchart of a method for transmitting transport channels over a physical channel of a cellular communication system in accordance with embodiments of the invention.

Figure 12:
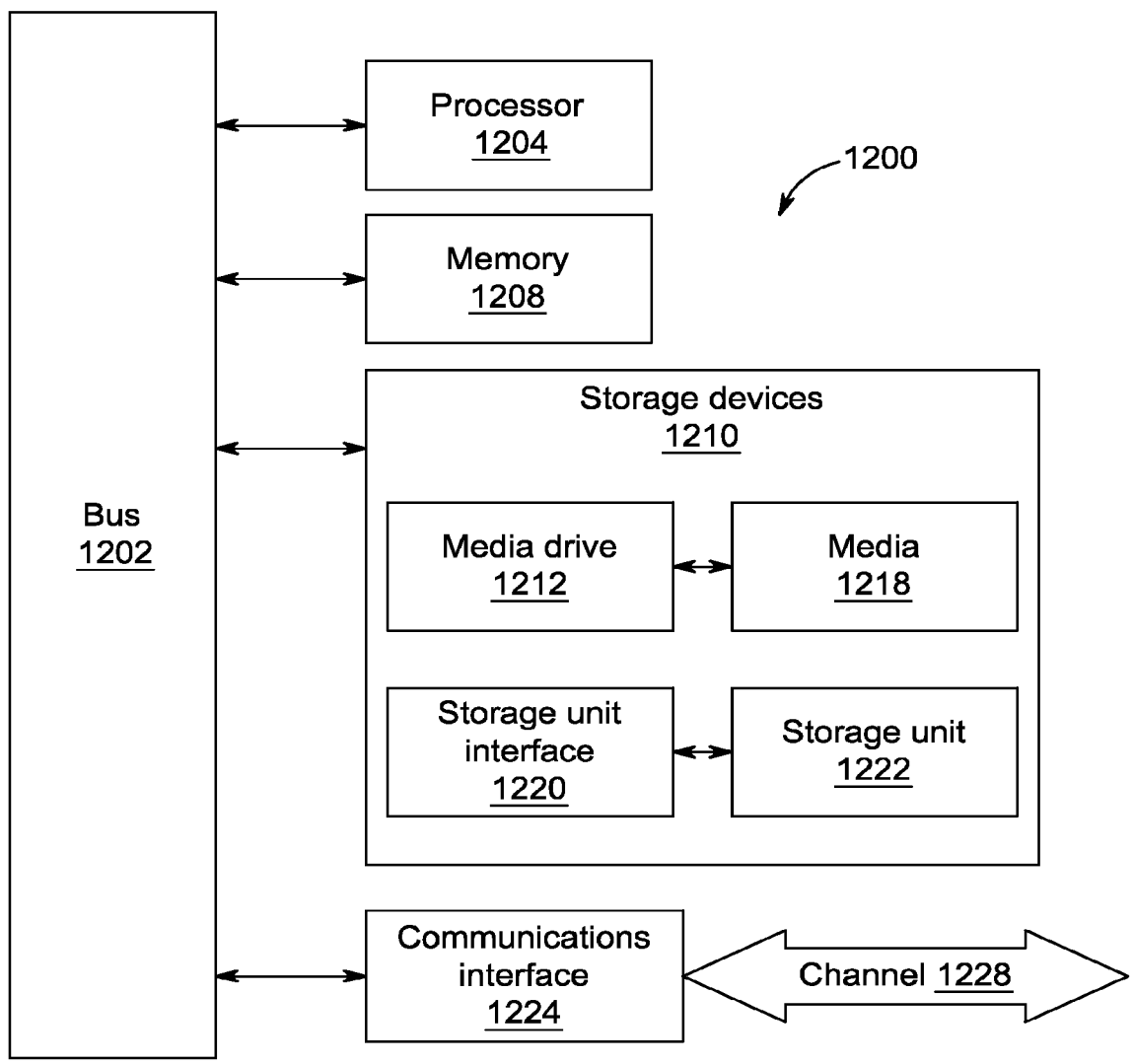

FIG. 12 illustrates a typical computing system that may be employed to implement processing functionality in accordance with embodiments of the invention.

DESCRIPTION OF EMBODIMENTS OF THE INVENTION

The following embodiments of the invention will be described in a context of a Forward Access Channel (FACH) provided as part of a Universal Mobile Telecommunications System (UMTS) communication network, as defined in 3GPP TS 22.146 and 3GPP TS 25.221 and other documents referenced therein. However, it will be appreciated by a skilled artisan that the inventive concept described herein may be applied to any direct signalling channel, such as a paging channel, an allocation channel such as HS-SCCH or applied to alternative comparable services.

The following embodiments of the invention will be described in a context of timeslots, for example with respect to a TDD implementation, but the inventive concept is equally applicable to any communication 'unit of resource', for example for non-TDD implementations. Thus, hereinafter the term timeslot in a TDD context encompasses any communication 'unit of resource' outside of a TDD domain.

In one embodiment of the invention, in contrast to the known art where the indicator bits are used in a paging channel to inform the UE whether it needs to turn its radio on for reading the PCH (i.e. as a battery saving mode), the indicator bits are used to inform the UE whether it should be reading the resources 'reserved' for FACH as a FACH channel, or whether it should be ignoring those resources (for example when they are being used for another channel such as HS-DSCH).

Referring now to FIG. 4, there is illustrated a part of a cellular communication network 400 according to embodiments of the invention. The cellular communication network 400 comprises a communication network node, which for the illustrated embodiment is in a form of a Node B (NODE B) 410, operably coupled to a radio network controller (RNC) 420, for example by way of a leased line provided by a fixed line telecommunications provider, a microwave link, an Ethernet cable or some other form of communication link. The RNC 420 may be further operably coupled to, for example, a Media Gateway (not shown).

The Node B 410 comprises signal processing logic 440 arranged to transmit one or more indicator bits, for example on a broadcast channel. The signal processing logic 440 is further arranged, upon receipt of a FACH message to be transmitted, for example from the RNC 420, to set at least one of the one or more indicator bits and to transmit the FACH message in at least one of one or more timeslots allocated for use by one or more FACH channels. The signal processing logic 440 is still further arranged to reallocate the one or more timeslots allocated to the one or more FACH channels, for use by one or more channels other than the one or more FACH channels, when no FACH messages are required to be transmitted.

The RNC 420 may, for example by way of a 'NODE B SETUP' message (e.g. 'COMMON TRANSPORT CHANNEL SETUP' in UMTS), instruct the Node B 410 those timeslot(s) that is/are to be allocated to the FACH channel(s), along with a set of channelisation codes that is reserved for the FACH channel(s) (codes used to separate the different channels that may be present on a certain frequency in a Code Division Multiple Access (CDMA) system), power headroom reserved for the RNC, etc. In a context of a 3GPP system, the generic expressions of 'NODE B SETUP" and 'SEND FACH' message may be referred to, for example, as 'COMMON TRANSPORT CHANNEL SETUP' and 'FACH frame protocol'.

Accordingly, the Node B 410 may comprise a memory element 450, in which the Node B 410 stores the settings provided by the RNC 420.

Alternatively, the Node B 410 may define which timeslot(s) are to be allocated to the FACH channel, along with a set of channelisation codes that are reserved for the FACH channel(s), power assigned to Node B FACH transmissions etc. The Node B may then inform the RNC of these definitions.

The signal processing logic 440 of the Node B 410 is arranged to transmit, upon receipt of a FACH message transmitted from the RNC 420, the one or more indicator bits within, for example, the broadcast channel. In this manner, by monitoring the channel carrying indicator bits, e.g. the broadcast channel, the UE 430 is able to determine whether there is a FACH message. If there is no indicator bit set, the UE 430 is able to power down its radio circuitry until the next time the channel carrying indicator bits is scheduled to be transmitted. If there is a FACH message, the UE 430 is able to read the contents of the FACH channel, and determine whether, or not, the message is intended for itself, as described in greater detail below.

Referring now to FIG. 5, there is illustrated an example of resource allocation in accordance with embodiments of the invention, where a FACH message is required to be transmitted. In particular, FIG. 5 illustrates a plurality of timeslots 510 within a 3.84 Mcps TDD UMTS frame.

The plurality of timeslots 510 are allocated to transport channels, which for the illustrated embodiments may comprise a Broadcast CHannel (BCH) 525, a High Speed Downlink Shared Channel (HS-DSCH) 505, a Shared Control Channel for the HS-DSCH (HS-SCCH) 515, and a Forward Access CHannel (FACH) 520. In embodiments of the invention, one timeslot also carries (what will hereinafter be referred to as) an INdicator Channel (INCH) 521, carrying indicator bits. FIG. 5 is labeled in terms of transport channels, but the skilled artisan will appreciate that transport channels are mapped to physical channels before transmission and that for the transport channels illustrated there is a one-to-one mapping between transport channel and physical channel. A skilled artisan will also appreciate that the timings between channels as shown in FIG. 5, and subsequent figures, are illustrative and may vary in an actual implementation of the invention.

Furthermore, the indicator bits may be sent on any channel used to send indicator bits, which may exist on a same timeslot as the BCH (but can also or alternatively exist on a timeslot other than that occupied by the broadcast channel (BCH)). For example, such indicator bits may take over some of the indicators that are used on other indicator channels (for example some of the E-HICH indicator bits would not be used for E-HICH purposes (e.g. acknowledging uplink transmissions), but would be used for transmission of FACH indicator bits instead).

Furthermore, the indicator bits may be either broadcast to all UEs in a cell, or transmitted to a targeted group of one or more UEs in a cell. For example, the targeted group of UEs may be a group of UEs with a particular capability or may be a group of UEs geographically located close to the Node B. An example method of targeting a group of UEs would be to mask the indicator bits with a scrambling code that is known to a group of UEs or to transmit the indicator bits at a power level such that only that group of UEs is able to receive the indicator bits reliably.

As previously mentioned, the FACH is a downlink transport channel that is used to carry control information to a UE. The FACH allows short messages to be sent from the network to the UE. These short messages are typically control type messages that are used, for example, to allocate physical resources to the UE, set up dedicated physical channels, etc. In particular, the FACH provides a service for a network to communicate with UEs, without having to set up dedicated physical resources.

As previously mentioned, with respect to FIG. 4, the RNC 420 may instruct the Node B 410 those timeslot resources that are to be reserved for the FACH, for example by way of a 'NODE B SETUP' message, along with the channelisation codes and transport formats to be applied to the FACH. Furthermore, when the network needs to send a FACH message to a UE, for example UE 430 of FIG. 4, the RNC 420 sends a message, for example a 'SEND FACH' message, to the Node B 410 comprising the content of the message, and the identity of the UE 430, such as a UE-ID for which the message is intended. The RNC 420 may also define other criteria such as the specific timeslot resources to be used (from those reserved), specific channelisation codes to be used, etc. Alternatively, the choice of timeslot resources, channelisation codes, etc. may be left to the Node B 410, and as such the Node B 410 schedules the transmission of FACH messages within the, or each, FACH channel 520.

The BCH is a downlink transport channel that is used to broadcast system and cell specific information. In particular, the NODE B 410 may use the BCH 525 to transmit resource information relating to common channels (where a common channel is a channel that a plurality of UEs are meant to decode, in contrast to a dedicated physical channel, which is meant to be decoded by a specific UE). The resource information may comprise descriptions of channelisation codes for common physical channels, timeslot resource allocations, and formats for transport channels such as coding and modulation.

For the illustrated embodiments, the INCH 521 further comprises one or more indicator bits, at least one of which comprises a FACH indicator bit 522. In this manner, the resource information on BCH further comprises description of the at least one indicator bit within the INCH 521.

The FACH indicator bit is used to indicate whether a FACH channel to which it relates is 'active'. Thus, for the embodiments illustrated in FIG. 5, the FACH indicator bit 522 is used to indicate whether the FACH is 'active'.

When the NODE B 410 is required to send a FACH message, for example having received a SEND FACH message from the RNC 420, the NODE B 410 sets the FACH indicator bit 522, as illustrated in FIG. 5. The NODE B 410 also transmits the FACH message within the FACH timeslot, along with the identity of the UE, for example the UE-ID, for which the message is intended.

In this manner, a UE 430 attached to the NODE B 410, is able to determine whether there is a FACH message by monitoring the INCH 521, and in particular by reading the FACH indicator bit 522. Upon reading a set FACH indicator bit, the UE 430 determines that the NODE B 430 is transmitting a FACH message, and using the resource information being transmitted in the BCH 525, is able to decode the FACH message. If the identity of the UE 430 matches the identity transmitted within the FACH message, the UE 430 acts on the message content.

Referring now to FIG. 6 there is illustrated the resource allocation of FIG. 5, where no FACH message is required to be transmitted. As the NODE B 410 has no FACH message to transmit, the FACH indicator bit 522 in the INCH 521 is not set. In this manner, a UE 420 attached to the NODE B 410, for example UE 430, is able to determine that the NODE B 110 is not transmitting a FACH message, by reading the FACH indicator bit 522, and accordingly the UE does not attempt to decode HS-DSCH resource as FACH. This may allow the UE to conserve battery power and avoids the UE incorrectly decoding HS-DSCH as FACH, thus improving reliability of the FACH transmission.

As will be appreciated by a skilled artisan, since the NODE B 410 is not transmitting a FACH message, the timeslot allocated to the FACH 520 is free. Therefore, in accordance with embodiments of the invention, the NODE B 410 is arranged to reallocate the FACH timeslot 520 for use by a channel other than the FACH, when no FACH message is required to be transmitted.

For the illustrated embodiments, the FACH timeslot 520 is reallocated for use by the HS-DSCH 505. The HS-DSCH 505 is a shared channel, the content and physical resources of which are allocated via the HS-SCCH 515, which is a downlink physical channel that carries control information for the HS-DSCH 505. A skilled artisan will appreciate that, although the HS-SCCH 515 is illustrated herein as occupying an entire timeslot, the HS-SCCH 515 may be multiplexed with other channels.

As previously mentioned, when the NODE B 410 is not transmitting a FACH message, it reallocates the FACH timeslot 520 for use by another channel, which for the illustrated embodiments is the HS-DSCH 505.

In this manner, when a FACH message is not being transmitted, the resources available to the HS-DSCH 505 can be expanded from, for the illustrated embodiments, seven timeslots to eight, an increase of approximately 14%. Thus, embodiments of the invention provide a more efficient use of physical resources, as compared with traditional techniques for providing services, such as that of FACH in traditional cellular communication systems.

Furthermore, unlike for the known solution for reusing the FACH timeslot described above, as the HS-DSCH 505 and HS-SCCH 515 are not used for transmitting FACH messages, these two channels do not each require a significant proportion (e.g. approximately 33%) of the Node B transmit power when a FACH message is to be transmitted. Rather, only the FACH, when a FACH message is being transmitted, requires 33% of the Node B transmit power.

Thus, an embodiment of the invention may provide an advantage of a more efficient use of physical resources, whilst substantially avoiding an increase in power requirements.

For the embodiments illustrated in FIG. 5 and FIG. 6, the FACH indicator bit 522 is illustrated as indicating 523 a state of the FACH within the same frame. A skilled artisan will appreciate that, for some UE implementations, this may not be feasible due to the processing requirements this would place on the UE.

Referring now to FIG. 7, there is illustrated an example of resource allocation in accordance with embodiments of the invention. In the same way as for the embodiments illustrated in FIG. 5 and FIG. 6, timeslots 710 within a frame are allocated to a BCH 725, HS-DSCH 705, HS-SCCH 715, FACH 720, INCH 721, etc.

For the embodiments illustrated in FIG. 7, the INCH 721 comprises a plurality of indicator bits, one of which, for the illustrated embodiments, is in the form of a FACH indicator bit 722, which indicates the state of the FACH 720 in a subsequent frame of the physical channel. For the illustrated embodiments, the FACH indicator bit 722 in frame 'n' indicates 723 the state of the FACH 720 within the next consecutive frame, frame 'n+1'. Thus, in FIG. 7, the FACH indicator bit 722 in frame 'n' is set, and thereby indicates that the FACH 720 is active in frame 'n+1'. In this manner, the processing requirements placed on a UE 430 are reduced, since the UE 430 is provided more time in which to prepare to decode the FACH 720 if the FACH 720 is active. As illustrated, the HS-SCCH 715 may also relate 716 to the HS-DSCH 705 in the next consecutive frame.

Referring now to FIG. 8, there is illustrated an example of resource allocation in accordance with embodiments of the invention. For the embodiments illustrated in FIGS. 5 to 7, a single FACH indicator bit is used to indicate a state of a single FACH, and the FACH is allocated an entire timeslot within the physical channel. A skilled artisan will appreciate that a NODE B may be arranged to provide more than one FACH, and that the plurality of FACHs may be allocated to one or more timeslots.

For the embodiments illustrated in FIG. 8, four FACH channels are allocated to a single timeslot, and the FACH indicator bit 822 indicates 823 whether at least one of the FACH channels is active. In this manner, if the NODE B is required to transmit one or more FACH messages, the NODE B sets the FACH indicator bit 822, and transmits the one or more FACH messages in one or more FACH channels 820 within the allocated timeslot. In this manner, a UE is able to determine whether a FACH message is to be transmitted by reading the FACH indicator bit 822 in the INCH 821. If the FACH indicator bit 822 is set, the UE then decodes the FACH timeslot and reads each of the four FACH channels therein to determine whether the one or more transmitted FACH messages are intended for itself.

If the NODE B is not required to transmit a FACH message, the NODE B sets the FACH indicator bit 822 to 'inactive', and reallocates the FACH timeslot for use by another transport channel, for example the HS-DSCH 805.

Referring now to FIG. 9, there is illustrated an example of resource allocation in accordance with embodiments of the invention. As in the embodiment illustrated in FIG. 8, four FACH channels are allocated to a single timeslot. However, for the embodiments illustrated in FIG. 9, the INCH 921 comprises a plurality of FACH indicator bits 922. For the illustrated embodiments, the INCH 921 comprises four FACH indicator bits 922, each FACH indicator bit 922 relating to one of the FACH channels 920.

In this manner, when the NODE B receives one or more FACH messages to be transmitted, the NODE B schedules transmission of the one or more FACH messages in one or more of the FACH channels 920, and sets one or more of the FACH indicator bits 922, to indicate those FACH channels 920 that are active.

Thus, FIG. 9 illustrates a case where the NODE B is required to transmit two FACH messages. Accordingly, the NODE B has set two of the FACH indicator bits 922, and transmits the FACH messages within the two corresponding FACH channels 920. As will be appreciated by a skilled artisan, for the embodiments illustrated in FIG. 9, only two out of four of the FACH channels 920 within the FACH timeslot are used. Accordingly, and in accordance with an embodiment of the invention, the NODE B re-allocates the timeslot resource for those FACH channels not required for transmitting FACH messages, for use by another transport channel, such as the HS-DSCH 905. In this manner, even when the NODE B is required to transmit FACH messages, free resource within the FACH allocated timeslot may be reused for other channels.

In the embodiments shown in FIG. 9, where a timeslot is partially used by FACH, a UE that is allocated HS-DSCH may advantageously modify its resource allocation based on the status of the FACH indicator bit. For example, if the UE is allocated all eight timeslots and all sixteen codes on HS-DSCH 905, and the FACH indicator bit is set, the UE may understand that in the FACH timeslot 920 it is actually allocated a reduced number of HS-DSCH codes. This is in contrast to the existing operation in 3GPP, where the same number of codes has to be allocated to a UE in all of the timeslots that it is allocated, due to signalling restrictions. However, in accordance with embodiments of the invention, the UE is signaled whether the FACH is active. Advantageously, the UE is able to use this indication to modify the HS-DSCH resource allocation (as the UE understands that if the FACH indicator bit was set, then the UE cannot be allocated all of the resource in the FACH timeslot as that resource is allocated elsewhere as FACH).

For the various embodiments illustrated and described herein, a single timeslot has been allocated for FACH channels. However, a skilled artisan will appreciate that more than one timeslot may be allocated for FACH channels. Accordingly, and in accordance with an embodiment of the invention, where more than one timeslot is allocated for FACH channels, the one or more timeslots may, individually or collectively, and as a whole or partly, be re-allocated for use by other channels when not required for the transmission of FACH messages.

Referring now to FIG. 10, there is illustrated a flow chart 1000 of a method for transmitting transport channels over a physical channel of a cellular communication system in accordance with embodiments of the invention.

The method starts at block 1010 and moves to block 1020, where it is determined whether a FACH message is required to be transmitted, for example whether a 'SEND FACH' command has been received from an RNC.

If it is determined that a FACH message is required to be transmitted, the method moves on to block 1030, where the FACH message(s) to be transmitted is/are scheduled for transmission in one or more timeslots allocated to one or more FACH channels. The method then moves on to block 1050.

Referring back to block 1020, if it is determined that no FACH message is required to be transmitted, the method moves on to block 1040, where the timeslot(s) allocated to the one or more FACH channels are re-allocated for use by one or more channels other than the one or more FACH channels. The method then moves on to block 1050.

In block 1050, the FACH indicator bit is configured as required for transmission in, for example a broadcast channel or indicator channel, indicating whether the FACH is active, e.g. a FACH message is to be transmitted, or not. That is to say, if a FACH message is to be transmitted, the FACH indicator bit is set (e.g. transmitted as a logic '1'), whereas if a FACH message is not to be transmitted, the FACH indicator bit is not set (e.g. transmitted as a logic '0' or alternatively the FACH indicator bit is simply not sent at all (for example in a Discontinuous Transmission (DTX) mode)). The method then moves on to block 1060, where the transmission of the transport channels is initiated. The method then returns to block 1020, as shown.

A skilled artisan will appreciate that only those blocks pertinent to the invention have been illustrated and described in order not to obscure the inventive concept.

Referring now to FIG. 11, there is illustrated a flowchart 1100 of a method for transmitting transport channels over a physical channel of a cellular communication system, in accordance with embodiments of the invention.

The method starts at block 1110 and moves to block 1120, where it is determined whether a FACH message is required to be transmitted. If it is determined that one or more FACH messages are required to be transmitted, the method moves on to block 1130, where the one or more FACH message(s) is/are scheduled for transmission within the allocated timeslot(s).

The method then moves on to block 1140, where it is determined whether resources allocated for FACH messages are free for use by other channels. If it is determined that no FACH resources are free in block 1140, the method moves on to block 1160. However, if it is determined that FACH resources are free, the method moves to block 1150.

Referring back to block 1120, if it is determined that no FACH messages are required to be transmitted, the method moves on to block 1150, where resources allocated for FACH messages that are not required for the transmission of FACH messages are re-allocated for use by other channels.

The method then moves to block 1160, where the, or each, FACH indicator bit is configured as being required within a broadcast channel or indicator channel, indicating whether the FACH is active, e.g. a FACH message is to be transmitted, or not. The method then moves on to block 1170, where the transmission of the transport channels is initiated. The method then returns to block 1120.

A skilled artisan will appreciate that only those blocks pertinent to the invention have been illustrated and described in order not to obscure the inventive concept.

For the various embodiments hereinbefore described, the, or each, indicator bit has been described as being provided within an indicator channel. Alternatively the indicator bits may be sent on the BCH or other channel. By way of example, the indicator bit(s) may be sent within a Transport Format Combination Indicator (TFCI) type field within the BCH, wherein the TFCI field is a field that is separately encoded to data traffic to which it relates. As another example, the indicator bits may be sent in the data portion of the BCH or other channel.

In an embodiment of the invention, the indicator bit(s) may be provided within a dedicated indicator channel. The indicator bits may also be transmitted as repetition encoded bits, or alternatively they may be more robustly encoded, such as jointly convolutionally encoded.

Alternatively, indicator bits may be transmitted within an indicator channel along with other indicator bits. For example indicator bits from the PICH (Paging Indicator CHannel) or E-HICH (E-DCH Hybrid ARQ Indicator CHannel) channels may be reassigned as FACH indicator bits.

While the invention has been described in terms of particular embodiments and illustrative figures, those of ordinary skill in the art will recognize that the invention is not limited to the embodiments or figures described. Although embodiments of the present invention are described, in some instances, using UMTS terminology, those skilled in the art will recognize that such terms are also used in a generic sense herein, and that the present invention is not limited to such systems.

Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term 'logic' herein refers to fixed hardware, programmable logic and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

FIG. 12 illustrates a typical computing system 1200 that may be employed to implement processing functionality in embodiments of the invention. Computing systems of this type may be used in the NodeB (in particular, the scheduler of the NodeB), core network elements, such as the GGSN, and RNCs, for example. Those skilled in the relevant art will also recognize how to implement the invention using other computer systems or architectures. Computing system 1200 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 1200 can include one or more processors, such as a processor 1204. Processor 1204 can be implemented using a general or special purpose processing engine such as, for example, a microprocessor, microcontroller or other control logic. In this example, processor 1204 is connected to a bus 1202 or other communications medium.

Computing system 1200 can also include a main memory 1208, such as random access memory (RAM) or other dynamic memory, for storing information and instructions to be executed by processor 1204. Main memory 1208 also may be used for storing temporary variables or other intermediate information during execution of instructions to be executed by processor 1204. Computing system 1200 may likewise include a read only memory (ROM) or other static storage device coupled to bus 1202 for storing static information and instructions for processor 1204.

The computing system 1200 may also include information storage system 1210, which may include, for example, a media drive 1212 and a removable storage interface 1220. The media drive 1212 may include a drive or other mechanism to support fixed or removable storage media, such as a hard disk drive, a floppy disk drive, a magnetic tape drive, an optical disk drive, a compact disc (CD) or digital video disk (DVD) read or write drive (R or RW), or other removable or fixed media drive. Storage media 1218 may include, for example, a hard disk, floppy disk, magnetic tape, optical disk, CD or DVD, or other fixed or removable medium that is read by and written to by a media drive. As these examples illustrate, the storage media 1218 may include a computer-readable storage medium having stored therein particular computer software or data.

In alternative embodiments, information storage system 1210 may include other similar components for allowing computer programs or other instructions or data to be loaded into computing system 1200. Such components may include, for example, a removable storage unit 1222 and an interface 1220, such as a program cartridge and cartridge interface, a removable memory (for example, a flash memory or other removable memory module) and memory slot, and other removable storage units 1222 and interfaces 1220 that allow software and data to be transferred from the removable storage unit 1222 to computing system 1200.

Computing system 1200 can also include a communications interface 1224. Communications interface 1224 can be used to allow software and data to be transferred between computing system 1200 and external devices. Examples of communications interface 1224 can include a modem, a network interface (such as an Ethernet or other NIC card), a communications port (such as for example, a universal serial bus (USB) port), a PCMCIA slot and card, etc. Software and data transferred via communications interface 1224 are in the form of signals which can be electronic, electromagnetic, optical or other signals capable of being received by communications interface 1224. These signals are provided to communications interface 1224 via a channel 1228. This channel 1228 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 1208, storage device 1218, or storage unit 1222. These and other forms of computer-readable media may store one or more instructions for use by processor 1204, to cause the processor to perform specified operations. Such instructions, generally referred to as 'computer program code' (which may be grouped in the form of computer programs or other groupings), when executed, enable the computing system 1200 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 1200 using, for example, removable storage drive 1212 or communications interface 1224. The control logic (in this example, software instructions or computer program code), when executed by the processor 1204, causes the processor 1204 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the invention has been described in connection with embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

It will be understood that the method and apparatus for transmitting transport channels over a physical channel of a cellular communication system described above provides, by way of example only, at least the advantages of a more efficient use of physical resources, whilst substantially avoiding an increase in power requirements.

What is claimed is:

1. A method performed by a user equipment (UE), the method comprising:
receiving, by the UE, first information including a first plurality of bits, wherein the first plurality of bits indicates a plurality of time slots that physical shared channel resources are utilized for first signaling channels;
monitoring, by the UE, the first signaling channels during the plurality of time slots for signaling information that indicates that the UE is present based on an identification of the UE;

processing, by the UE, the signaling information in response to the signaling information indicating the UE is present;

receiving, by the UE, second information including a second plurality of bits, wherein the second plurality of bits indicates second time slots that the physical shared channel resources are utilized for second signaling channels; and monitoring, by the UE, the second signaling channels during the second time slots.

2. The method of claim 1, wherein the first information is received over a broadcast channel.

3. The method of claim 1, wherein the first information is received over a broadcast channel and the second information is received as common configuration information.

4. The method of claim 1 further comprising:

receiving, by the UE, a physical downlink shared channel in an indicated time slot that the UE monitors the first signaling channels.

5. The method of claim 1 further comprising:

receiving, by the UE, an allocation for a physical downlink shared channel in the one or more time slots;

receiving, by the UE, in a control channel an indication that a portion of resources allocated to the physical downlink shared channel in one time slot of the one or more time slots is used by a different channel; and receiving, by the UE, the physical downlink shared channel in the one time slot.

6. The method of claim 5, wherein the UE avoids processing for physical downlink shared channel data the indicated portion of resources.

7. The method of claim 5, wherein the control channel has an identification different than the identification of the UE.

8. The method of claim 1, wherein signaling information determined to be for the UE based on the identification of the UE includes an indication of a time slot and a modulation for a physical downlink shared channel assigned to the UE.

9. The method of claim 8, wherein the signaling information for the UE includes resources for the physical downlink shared channel assigned to the UE.

10. The method of claim 1, wherein the indicated time slots are not consecutive time slots.

11. A non-transient computer readable medium comprising program instructions for causing a user equipment (UE) to perform a method of:

receiving first information including a first plurality of bits, wherein the first plurality of bits indicates a plurality of time slots that physical shared channel resources are utilized for first signaling channels;

monitoring the first signaling channels during the plurality of time slots for signaling information that indicates that the UE is present based on an identification of the UE;

processing the signaling information in response to the signaling information indicating the UE is present;

receiving second information including a second plurality of bits, wherein the second plurality of bits indicates second time slots that the physical shared channel resources are utilized for second signaling channels; and monitoring the second signaling channels during the second time slots.

12. The non-transient computer readable medium of claim 11, wherein the first information is received over a broadcast channel.

13. The non-transient computer readable medium of claim 11, wherein the first information is received over a broadcast channel and the second information is received as common configuration information.

14. The non-transient computer readable medium of claim 11 further comprising instructions for:

receiving a physical downlink shared channel in an indicated time slot that the UE monitors the first signaling channels.

15. The non-transient computer readable medium of claim 11 further comprising instructions for:

receiving an allocation for a physical downlink shared channel in the one or more time slots; and receiving in a control channel, an indication that a portion of resources allocated to the physical downlink shared channel in one time slot of the one or more time slots is used by a different channel; and receiving the physical downlink shared channel in the one time slot.

16. The non-transient computer readable medium of claim 15, wherein the UE avoids processing for physical downlink shared channel data the indicated portion of resources.

17. The non-transient computer readable medium of claim 15, wherein the control channel has an identification different than the identification of the UE.

18. The non-transient computer readable medium of claim 11, wherein signaling information determined to be for the UE based on the identification of the UE includes an indication of a time slot and a modulation for a physical downlink shared channel assigned to the UE.

* * * * *